(12) United States Patent
Adams

(10) Patent No.: US 6,807,203 B2
(45) Date of Patent: Oct. 19, 2004

(54) CALIBRATING A FREQUENCY DIFFERENCE BETWEEN TWO OR MORE LASERS OVER AN EXTENDED FREQUENCY RANGE

(75) Inventor: Frank J. Adams, Los Altos, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 196 days.

(21) Appl. No.: 10/006,786

(22) Filed: Dec. 5, 2001

(65) Prior Publication Data

US 2003/0103213 A1 Jun. 5, 2003

(51) Int. Cl.$^7$ ................................................ H01S 3/13
(52) U.S. Cl. ........................................ 372/32; 372/28
(58) Field of Search ........................... 356/484; 372/32, 372/28, 9, 29.01, 20, 25, 29.016, 29.011

(56) References Cited

U.S. PATENT DOCUMENTS

| | | | | |
|---|---|---|---|---|
| 3,879,992 A | | 4/1975 | Bartera | 73/30 |
| 4,284,964 A | * | 8/1981 | Maier, Jr. | 372/32 |
| 4,331,022 A | * | 5/1982 | Coussot et al. | 73/1.59 |
| 5,189,485 A | * | 2/1993 | Hackel et al. | 356/320 |
| 5,347,525 A | * | 9/1994 | Faris | 372/19 |
| 5,359,613 A | | 10/1994 | Mols et al. | 372/20 |
| 5,546,810 A | | 8/1996 | Arikawa et al. | 73/702 |
| 5,780,843 A | * | 7/1998 | Cliche et al. | 250/226 |
| 6,134,253 A | * | 10/2000 | Munks et al. | 372/32 |
| 6,163,555 A | * | 12/2000 | Siddiqui et al. | 372/32 |
| 6,239,877 B1 | * | 5/2001 | Beauducel | 356/484 |
| 6,542,841 B1 | * | 4/2003 | Snyder | 702/104 |
| 6,553,042 B2 | * | 4/2003 | Shio et al. | 372/9 |

* cited by examiner

Primary Examiner—Don Wong
Assistant Examiner—Tuan N. Nguyen
(74) Attorney, Agent, or Firm—JDI Patent; Joshua D. Isenberg

(57) ABSTRACT

Methods and apparatus for calibrating a frequency difference between two or more lasers over an extended frequency range as well as optical signal generators that employ such an apparatus or method are disclosed. The lasers are tuned in coordination with respect to one or more readily characterized narrow frequency ranges to characterize one or more tuning parameters of each of the lasers over the extended frequency range. The apparatus may include first and second tuning controllers respectively coupled to the first and second lasers, an optical coupler optically coupled to the first laser and the second laser, a frequency detector coupled to the optical coupler and a controller coupled to the frequency detector and the temperature controllers. The controller may include a processor and a memory containing processor executable instructions for calibrating the two lasers in accordance with the method described above. Such a frequency calibration apparatus may be incorporated with the lasers into a signal generator apparatus.

22 Claims, 5 Drawing Sheets

CALIBRATING A FREQUENCY DIFFERENCE BETWEEN TWO OR MORE LASERS OVER AN EXTENDED FREQUENCY RANGE

FIELD OF THE INVENTION

This invention generally relates to lasers and more particularly this invention relates to optical heterodyne frequency generation.

BACKGROUND OF THE INVENTION

There are many test applications that require an optical signal to be modulated at a radio or microwave frequency. Such applications include receiver testing, optical-based microwave generation, testing of microwave components, direct optical injection of source signals for high frequency testing (photo-detector on chip) and fiber delivery of microwave signals for remote antennae testing. Presently there are three methods for high frequency optical modulation. The first technique, known as an impulse technique, involves applying an impulse from a mode locked laser. Using a spectrum analyzer, a frequency domain response can be obtained. For modulation frequencies in the hundreds of gigahertz (GHz) this can be expensive. Furthermore this method is difficult to calibrate since the frequency amplitudes of the mode-locked pulses are generally not known. Recovering accurate phase information is even more difficult and often impossible.

An alternative is to modulate a laser using an RF or microwave modulator. However, for modulation at high frequencies it is desirable to use a frequency synthesizer that is both NIST traceable (i.e., calibrated in a manner traceable to a National Institute of Standards and Technology reference source) and stable with respect to both frequency and amplitude. Such synthesizers can be expensive for frequencies above a few tens of gigahertz. Furthermore, although the modulation frequency can be calibrated using this technique, it is difficult to calibrate the amplitude of the modulated signal.

Thus, there is a need in the art for a high-speed verifiable frequency calibration technique in optical heterodyne systems that avoids the costs associated with high-speed frequency detector electronics, and can extend to frequencies where it is currently not possible.

SUMMARY OF THE INVENTION

The disadvantages associated with the prior art are overcome by embodiments of the present invention directed to methods and apparatus for method for calibrating a frequency difference between two or more lasers over an extended frequency range. Additional embodiments are directed to optical signal generators that employ such a method or apparatus.

According to one embodiment among others the method may generally proceed by tuning the lasers in coordination with respect to one or more readily characterized narrow frequency ranges to characterize one or more tuning parameters of each of the lasers over the extended frequency range. By way of example, the frequency difference may be calibrated with respect to the tuning parameters over first and second narrow frequency ranges and the resulting frequency difference calibrations may be coordinated with respect to the tuning parameters over the extended frequency range.

Embodiments of the method for calibrating the frequency difference between two lasers may be embodied in a computer readable medium having embodied therein a set of computer readable instructions that implement the method described above.

The sequence of events set forth in the method may be carried out by a suitably configured apparatus. According to one embodiment of the invention among others, such an apparatus may include first and second tuning controllers respectively coupled to the first and second lasers, an optical coupler optically coupled to the first laser and the second laser, a frequency detector coupled to the optical coupler and a controller coupled to the frequency detector and the tuning controllers. The controller may include a processor and a memory containing processor executable instructions for calibrating the two lasers in accordance with the method described above. Such frequency calibration apparatus may be incorporated with the first and second lasers into a signal generator apparatus. The frequency detector may include a local detector optically coupled to the optical coupler, a phase locked loop coupled to the local detector and the controller, an integrator coupled to the phase locked loop and the controller, a direct digital synthesizer coupled to the phase locked loop and the controller, and an oscillator coupled to the direct digital synthesizer.

Embodiments of the present invention provide for frequency calibration between two or more lasers over a frequency range greater than that of the frequency detector used and/or its associated electronics. This enables frequency calibration over a broad range while using a relatively inexpensive low-frequency reference.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1A:
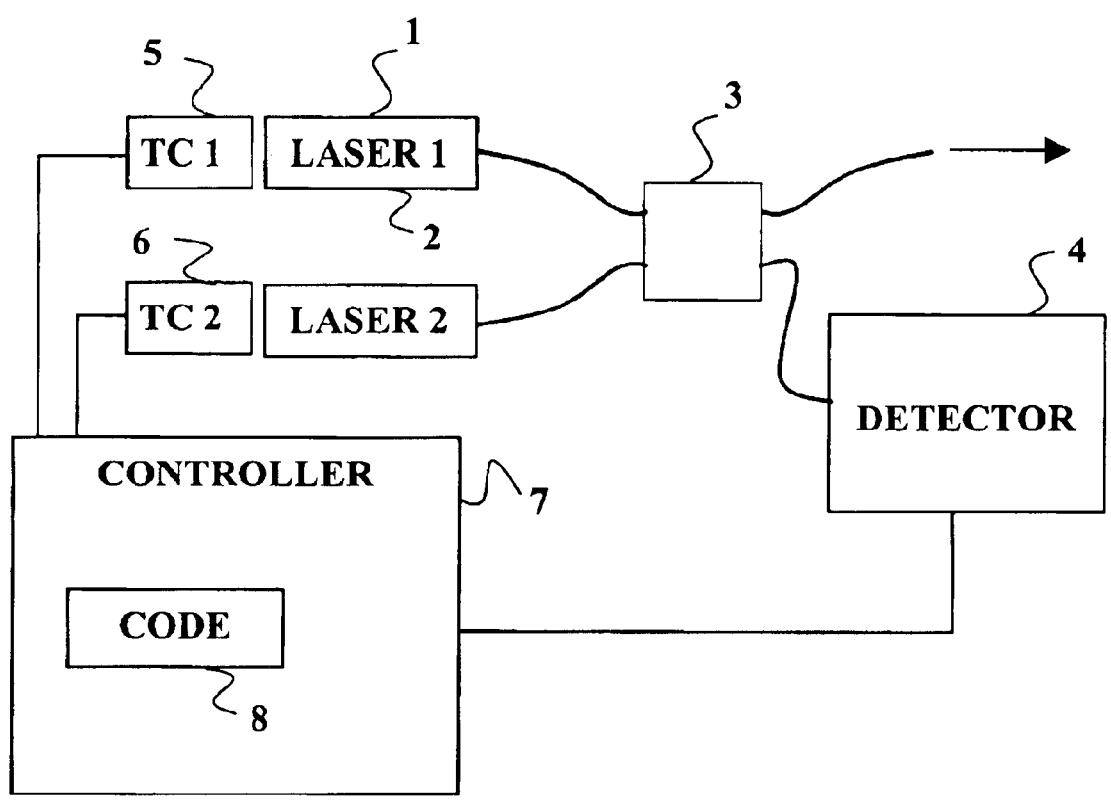
FIG. 1A depicts a block diagram illustrating an apparatus for use with a method for calibrating two lasers according to an embodiment of the present invention.

Although the following detailed description contains many specific details for the purposes of illustration, anyone of ordinary skill in the art will appreciate that many variations and alterations to the following details are within the scope of the invention. Although portions of the following description are set forth in terms of varying the frequency difference between two lasers by varying their temperatures, those of skill in the art will recognize that other laser parameters may be varied to change the frequency difference. For example, changing the diode current of a diode laser varies the laser signal frequency, but this also changes the power level. Furthermore, although an example of a particular apparatus for carrying out the method is depicted and described with respect to FIG. 2, those of skill in the art will be able to devise other apparatus capable of implementing embodiments of the method of the present invention. Accordingly, the exemplary embodiments of the invention described below are set forth without any loss of generality to, and without imposing limitations upon, the claimed invention.

Embodiments of the method of the present invention provide for calibrating the frequency difference between two or more lasers as a function of their temperatures over a frequency difference range that is greater than a finite range available to the frequency detector and/or its associated electronics. Each laser produces a signal having a characteristic frequency. Depending on the specific application, the lasers may be of the same type and may have similar frequency dependence characteristics. For example, the frequency of a diode pumped laser typically decreases as the laser temperature increases. The signals may be combined to produce a heterodyne signal that is coupled to a frequency detector that measures a beat frequency equal to the difference in frequency between the two signals. The lasers are tuned in coordination with respect to one or more readily characterized narrow frequency ranges to characterize one or more tuning parameters of each of the lasers over the extended frequency range.

An example of one of many possible embodiments of a method of the present invention is illustrated in FIGS. 1A–1D. This particular embodiment of the method is best understood by simultaneously referring to FIGS. 1A–1C. As shown in the schematic diagram of FIG. 1A, two lasers 1, 2 produce optical signals having frequencies $f_1$, $f_2$ respectively. The signals from laser 1 and laser 2 are combined by an optical coupler 3 to produce a heterodyne output signal having a beat frequency $\Delta f$ equal to $f_1-f_2$. A portion of the combined output may be coupled to a detector 4 that measures the beat frequency $\Delta f$. The frequencies of laser 1 and laser 2 may be varied, e.g., by varying appropriate tuning parameters. The frequencies of the lasers 1, 2 may be tuned, e.g., using tuning controllers 5, 6 coupled to lasers 1, 2 respectively. The detector 4 and tuning controllers 5, 6 are coupled to a controller unit 7. The controller unit 7 may include control electronics for operating the temperature controllers in response to measurements from the detector and instructions in the form of a code 8. The code 8 includes instructions for calibrating the frequency difference between laser 1 and laser 2 using the detector 4 and tuning controllers 5, 6. By way of example the tuning controllers 5, 6 may be temperature controllers such as thermoelectric units that utilize the Peltier effect to change the temperatures $T_1$, $T_2$ of the lasers 1, 2. The tuning controllers 5, 6 may include sensors for measuring the tuning parameters of the lasers 1, 2. In the case of temperature controllers, such sensors may include thermocouples, thermistors, or resistive elements for measuring the temperatures of laser 1 and laser 2. It is important that the tuning controllers 5, 6 be able to reliably set the tuning parameters of the lasers 1, 2 such that the a given controller setting may be reliably and repeatably associated with the same value of the laser tuning parameter.

Figure 1B:
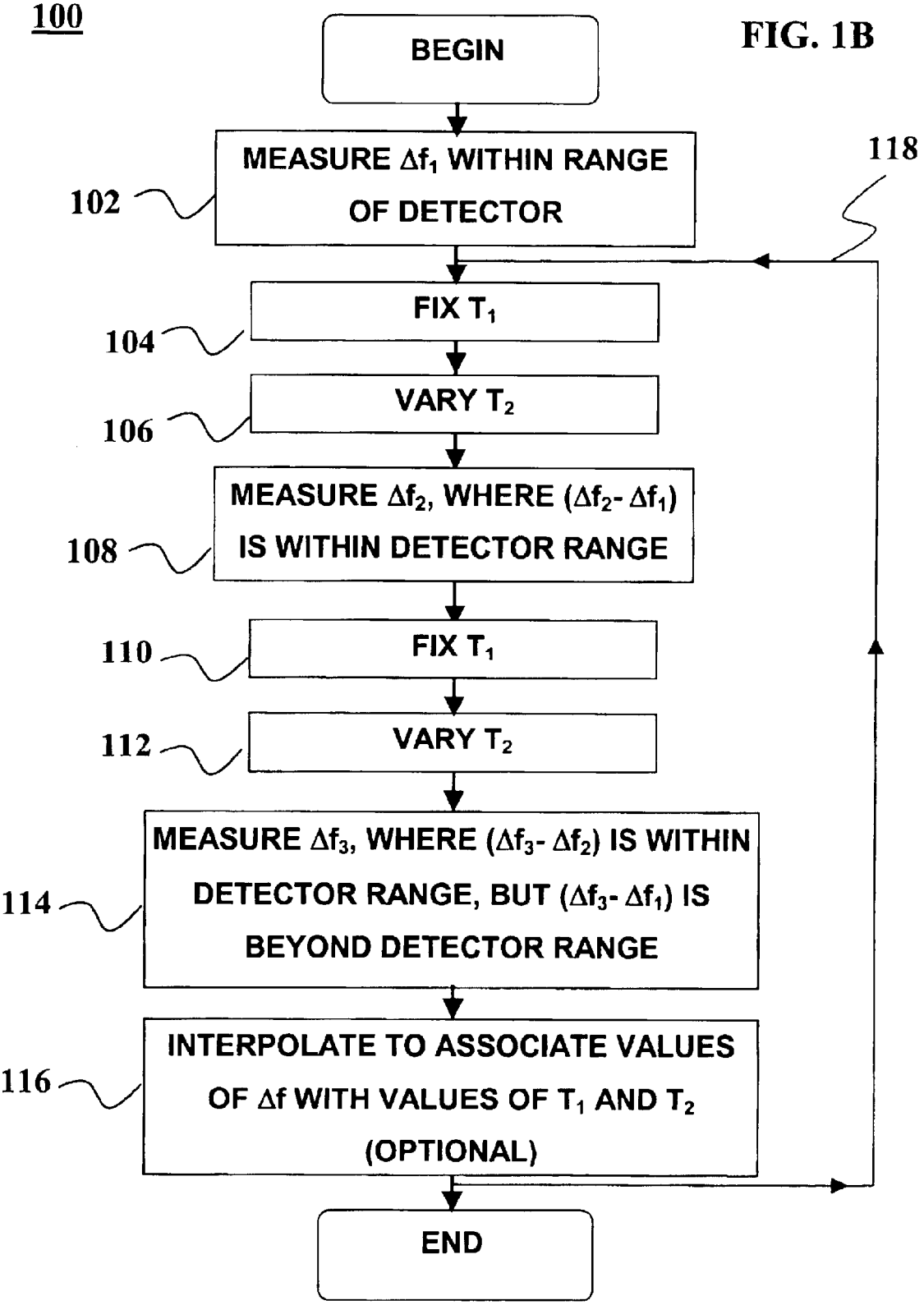
FIG. 1B depicts a flow diagram illustrating a method for calibrating two lasers according to an embodiment of the present invention.

FIG. 1B depicts a flow diagram of a method 100 for calibrating the frequency difference between two lasers. Such a method may be implemented by the code 8 of FIG. 1A. For the purposes of example, in the embodiment depicted in FIG. 1B the tuning parameters of the lasers 1, 2 are their respective temperatures. The frequency versus temperature diagram of FIG. 1C graphically illustrates the steps shown in FIG. 1B. The method 100 generally begins at step 102 by measuring a first frequency difference $\Delta f_1$ at known temperatures $T_{11}$ and $T_{21}$ for laser 1 and laser 2 respectively. The values of the laser temperatures $T_{11}$ and $T_{21}$, are, in general arbitrary. In order to be measured, however, the value of $\Delta f_1$ naturally must lie within a finite range of frequency detector 4. This finite range may be limited by, amongst other things, the characteristics of the detector 4 or by the characteristics of electronics associated with the detector 4. Once the initial value of the frequency difference $\Delta f_1$ is measured, the temperature of one of the lasers, e.g. laser 1, may be fixed at step 104 by tuning controller 5. The temperature of the other laser, e.g. laser 2 is varied at step 106, e.g., with tuning controller 6, and one or more second frequency difference values $\Delta f_2$ are recorded at step 108 using the frequency detector 4. The second frequency difference $\Delta f_2$ can be associated with the temperature $T_{11}$ for laser 1 and a new temperature $T_{22}$ for laser 2.

To maximize the use of the available finite range of the detector 4 it is often desirable to start with a value $\Delta f_1$ that is close to the limit of the detector range. It is also possible to take advantage of the fact that the detector 4 measures frequency differences. Then in step 106 the temperature may be varied so that the frequency difference between laser 1 and laser 2 decreases, goes to zero and then increases again to near the limit of the detector range. As a practical matter, if the detector 4 can measure a frequency difference of up to 10 GHz, real differences in frequency of up to 20 GHz may be calibrated in one step. For example, laser 1 and laser 2 may initially be at values of $T_{11}$ and $T_{21}$ such that laser 2's frequency is 10 GHz more than laser 1's, i.e. $\Delta f_1$=+10 GHz. Laser 2's frequency may be decreased until the frequency difference is zero, whereupon the frequency difference changes sign. Laser 2's frequency may continue to decrease until, at $T_{22}$, it is 10 GHz less than laser 1's frequency, i.e., $\Delta f_2$=−10 GHz. Thus, a frequency difference of $\Delta f_1-\Delta f_2$=10 GHz−(−10 GHz)=20 GHz may be associated with the temperatures $T_{11}$ and $T_{22}$.

Figure 1C:
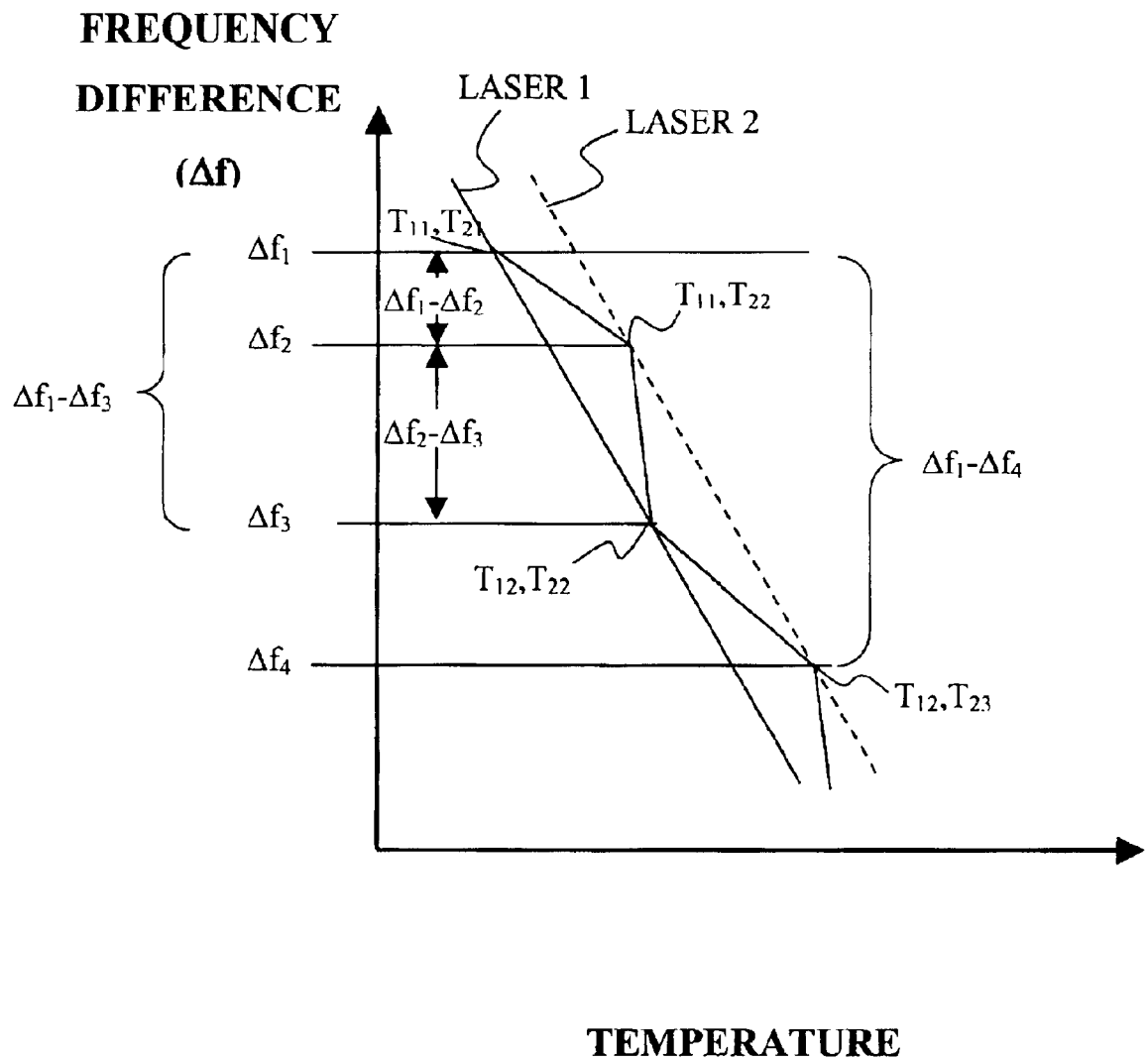
FIG. 1C depicts a graph of frequency difference versus temperature illustrating the method of the flow diagram of FIG. 1A.

The first and second frequency difference measurements $\Delta f_1$, $\Delta f_2$ cover a frequency difference range indicated as $\Delta f_1-\Delta f_2$ in FIG. 1C, which is within the finite range of the detector 4. To calibrate frequencies beyond the finite range of the detector 4 the temperature of laser 2 is fixed at $T_{22}$ in step 110 and the temperature of the laser 1 is allowed to vary at step 112. At step 114 for one or more values $T_{12}$ of the temperature of the first laser, a third frequency difference value $\Delta f_3$ is measured with the detector. In order to assure that the third frequency difference $\Delta f_3$ is within the finite range of the detector 4, it is desirable at step 112 to vary the temperature of the laser 1 in the same manner as the temperature of laser 2 was varied in step 106. For example, if the temperature of laser 2 was increased in step 106, it is desirable to increase the temperature of laser 1 is step 112. The frequency difference range between the second and third frequency difference values, indicated as $\Delta f_2-\Delta f_3$ in FIG. 1C, lies within the finite range of the frequency detector and/or its associated electronics. However, the frequency difference range between the $\Delta f_1$ and $\Delta f_3$, indicated as $\Delta f_1-\Delta f_3$ in FIG. 1C, extends beyond the finite range of the frequency detector. Thus it is possible to associate with temperature $T_{12}$ for laser 1 and temperature $T_{22}$ for laser 2 a frequency difference value of $\Delta f_1-\Delta f_3$. An additional calibration step may be added, e.g., by fixing the temperature of laser 1 at $T_{12}$ and increasing the temperature of laser 2 to $T_{23}$. A frequency difference $\Delta f_4$ may be obtained to provide a fourth calibration point that extends the frequency difference calibration range to $\Delta f_1-\Delta f_4$ as shown in FIG. 1C. The calibration procedure may be repeated as indicated by the arrow 118 in FIG. 1B to extend the frequency range for which laser 1 and laser 2 are calibrated. The calibration method may be extended to any number of additional steps up to the operational limits of laser 1 and laser 2. Other limits on the calibration method are the repeatability and accuracy constraints of the temperature control units 5 and 6. Continued calibration steps can be used to extend the calibration data to the operational limits of the lasers as shown by example in FIG. 1C. Each subsequent step uses the known temperature/frequency point of one laser to create another known point through the use of the available detector 4.

Using this technique it is possible to construct a map in temperature-frequency space showing all the frequency differences that are reachable for any two given values of the temperature of laser 1 and laser 2. To illustrate this, suppose both laser 1 and laser 2 are initially at the same temperatures $T_1$, $T_2$, e.g., both are at 30° C. For the sake of illustration, assume that laser 1 and laser 2 have identical frequency/temperature characteristics such that they emit signals of the same frequency when they are at the same temperature. The detector 4 measures an initial frequency difference $\Delta f_1$=0 GHz. $T_1$ is fixed at 30° C. while $T_2$ rises to 32° C. at which point detector 4 measures a frequency difference of say, $\Delta f_2$=10 GHz. $T_2$ is then held fixed at 32° C. and $T_1$ is increased to 32° C. at which point the detector 4 measures a frequency difference $\Delta f_3$ of 0 GHz. $T_1$ is again increased to 34° C. at which point detector 4 measures a frequency difference $\Delta f_4$ of −10 GHz. $T_1$ is then kept at 34° C. while $T_2$ increases to 34° C. at which point the detector 4 measures a frequency difference $\Delta f_5$ of 0 GHz. At this point, $T_2$ may be fixed at 34° C. while $T_1$ decreases to 32° C. at which point the detector 4 measures a frequency difference $\Delta f_6$ of +10 GHz. $T_1$ is then kept at 32° C. while $T_2$ decreases from 34° C. to 30° C., at which point the detector 4 measures a frequency difference $\Delta f_7$ of −10 GHz. The raw data for this calibration sequence are shown in Table I below.

TABLE I

| Data Point (i) | $T_1$ (° C.) | $T_2$ (° C.) | $\Delta f_i$ (GHz) |
| --- | --- | --- | --- |
| 1 | 30 | 30 | 0 |
| 3 | 30 | 32 | +10 |
| 3 | 32 | 32 | 0 |
| 4 | 34 | 32 | −10 |
| 5 | 34 | 34 | 0 |
| 6 | 32 | 34 | +10 |
| 7 | 32 | 30 | −10 |

Table I may be rewritten as shown in Table II below to show the dependence of $\Delta f$ on $T_1$ and $T_2$.

TABLE II

| | $T_1$ (° C.) | | |
| --- | --- | --- | --- |
| $T_2$ (° C.) | 30 | 32 | 34 |
| 30 | $\Delta f_1$ = 0 | $\Delta f_7$ = −10 | |
| 32 | $\Delta f_2$ = +10 | $\Delta f_3$ = 0 | $\Delta f_4$ = −10 |
| 34 | | $\Delta f_5$ = +10 | $\Delta f_5$ = 0 |

As described above with respect to FIG. 1C it is possible to fill in the blank spaces in Table II through a straightforward process of interpolation at optional step 116 to obtain coordinated frequency difference values outside the range of the detector 4. Specifically, the coordinated value of $\Delta f$=+20 GHz at $T_1$=30° C. and $T_2$=34° C. may be obtained by observing that when $T_2$ increased from 30° C. to 32° C., $\Delta f$ increased by 10 GHz from 0 to +10 and when $T_2$ increase from 32° C. to 34° C. $\Delta f$ increased again by 10 GHz. Thus the total increase in $\Delta f$ when $T_2$ increases from 30° C. to 34° C. is 20 GHz. By an analogous interpolation, at $T_1$=34° C. and $T_2$=30° C. $\Delta f$ has a value of −20 GHz. Thus the temperature/frequency difference calibration for laser 1 and laser 2 may be as shown in Table III below.

TABLE III

| | $T_1$ (° C.) | | |
| --- | --- | --- | --- |
| $T_2$ (° C.) | 30 | 32 | 34 |
| 30 | 0 GHz | −10 GHz | −20 GHz |
| 32 | +10 GHz | 0 GHz | −10 GHz |
| 34 | +20 GHz | +10 GHz | 0 GHz |

Figure 1D:
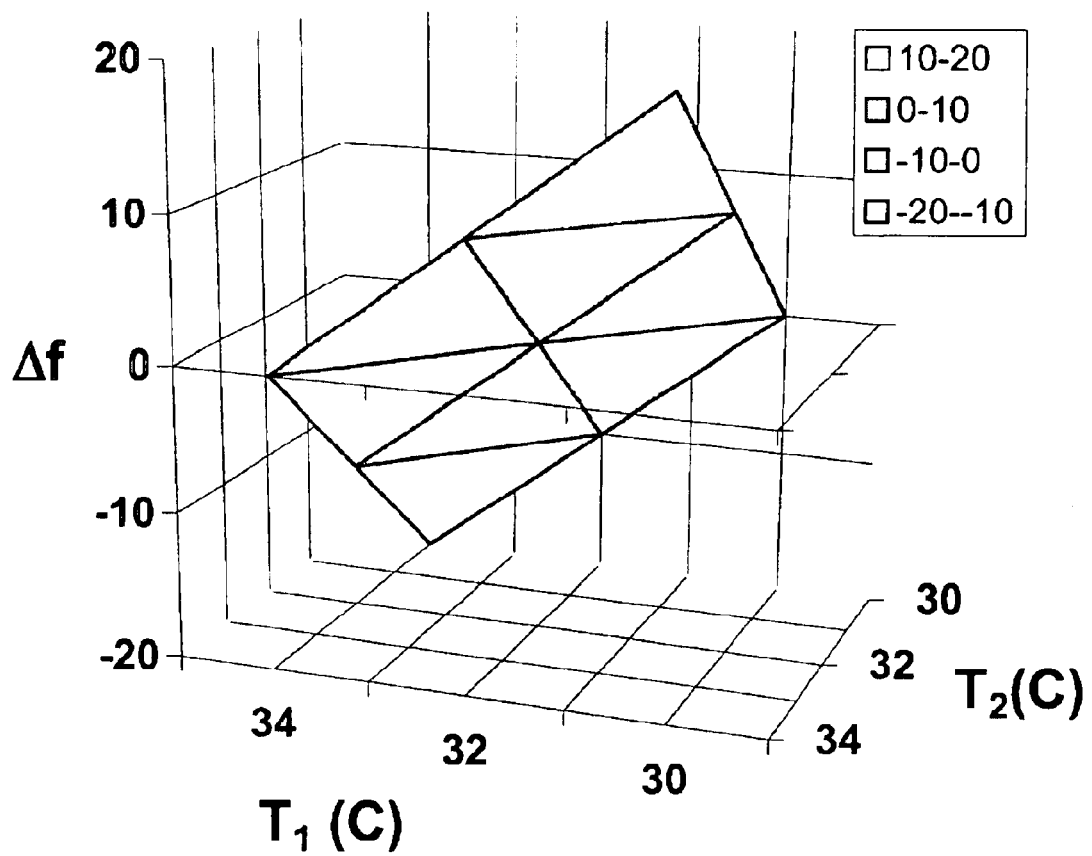
FIG. 1D depicts a graph of frequency difference versus the temperatures of two lasers.

Table III may be plotted as a three-dimensional graph of frequency difference $\Delta f$ versus the laser temperatures $T_1$ and $T_2$ as shown in FIG. 1D. By suitable repetition of the procedures outlined above, a calibration table similar to Table III may be produced for frequency differences up to the maximum frequency difference possible given the limitations of the lasers 1, 2 and tuning controllers 5, 6.

The method 100 describe above with respect to FIGS. 1A–1D may be embodied as a set of computer readable instructions, e.g., as a program stored in a computer readable medium. Such a medium may include magnetic disk, magnetic tape, optical disk, ROM, RAM, CD-ROM and the like. Furthermore a data table having features in common with Table III may likewise be stored in such a computer readable medium to provide temperature frequency calibration information for two lasers.

Figure 2:
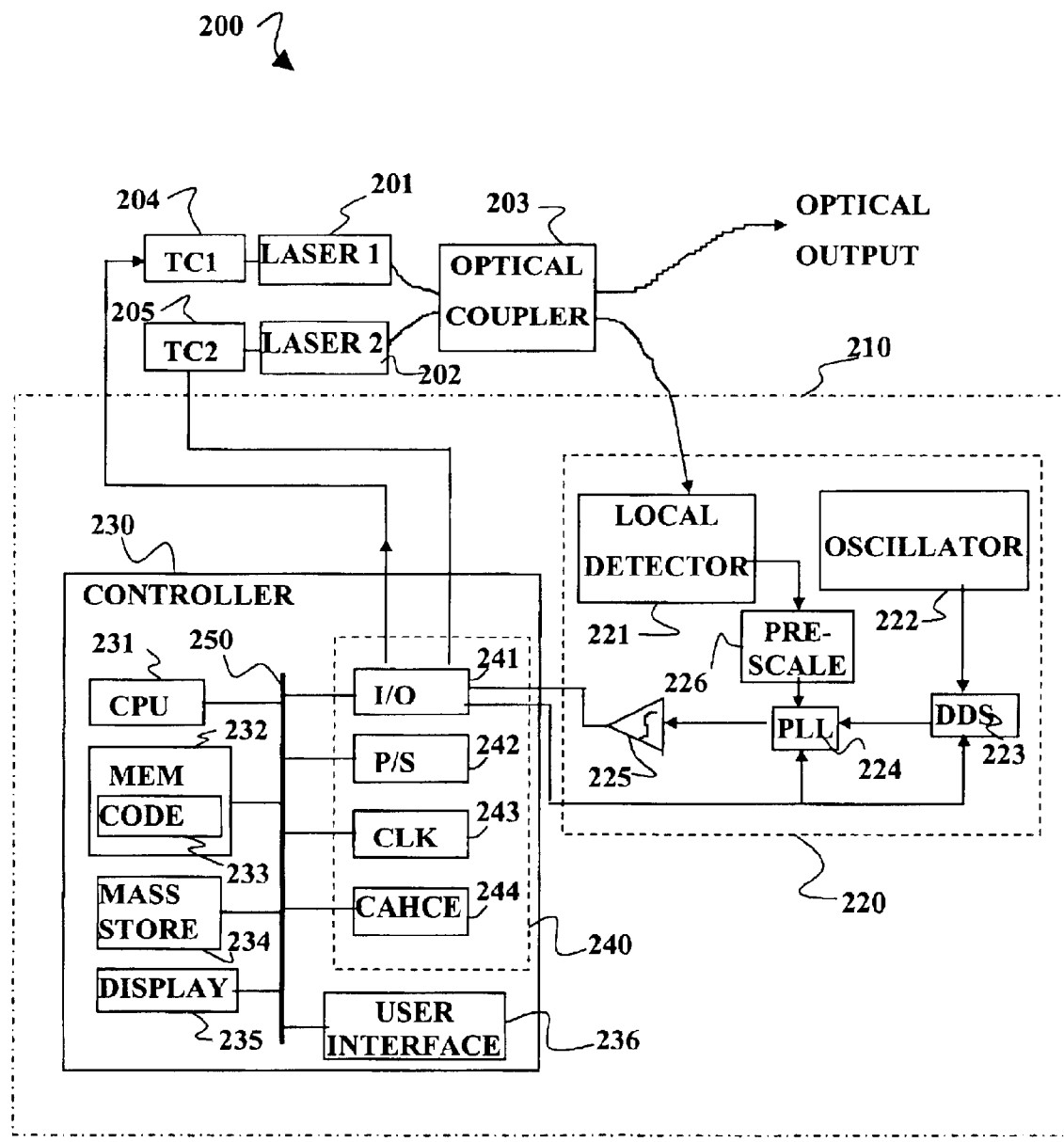
FIG. 2 is a block diagram of a optical signal generator apparatus according to an embodiment of the present invention.

Embodiments of the calibration method, such as those described above with respect to FIGS. 1A–1D, may be incorporated into an apparatus for calibrating a frequency difference between two lasers. Such an apparatus is useful, e.g., in an optical signal generator. By way of example, and without loss of generality FIG. 2 depicts a schematic diagram depicting an optical signal generator 200 that incorporates a calibration apparatus 210 according to one embodiment of the present invention among others. The architecture shown in FIG. 2 allows the frequency calibration to be incorporated into an instrument environment and not be dependent on outside equipment. Such a signal generator and apparatus may be used to generate calibration data of the type described above with respect to Tables I, II, III and FIG. 1D.

The signal generator 200 generally includes a first laser 201, a second laser 202, an optical coupler 203 and the calibration apparatus 210, which includes a detector 220 and a controller 230. By way of example, each of the lasers 201, 202 may be a model D2525P distributed feedback laser modules from Lucent Technologies of Murray Hill, N.J. Alternatively, Model A1915L DFB laser modules from Alcatel of Paris, France are pin for pin compatible. Although it is often desirable for the first and second lasers 202, 202 to be of the same type or model, this is not strictly required. Each of the lasers 201, 202 produces a separate optical output that is frequency tunable, e.g. with tuning controllers 204 and 205 respectively. As described above with respect to FIG. 1A, the tuning controllers 204, 205 may be temperature controllers such as thermoelectric units that control the temperatures of the lasers 201, 202 e.g., by using the Peltier effect to cool them. Alternatively, the tuning control units may include heaters that heat lasers 201, 202 to run the lasers hot. The tuning controllers 204, 205 may be coupled to the controller 230 in a closed loop feedback system using a digital to analog (D/A) converter to set laser frequency for each laser. The tuning controllers 204, 205 may include temperature sensors, e.g., in the form of resistive elements, thermistors or thermocouples. The exact form of the sensors is not critical so long as each provides a signal related to a tuning parameter in a consistent manner so that that a tuning controller may set a laser to back to the same value of the tuning parameter at a later time. Depending upon the design of the lasers, the tuning controllers may be incorporated into power supply units for the lasers 201, 202 or they may be stand-alone units that are separate from the lasers. As such the tuning controllers 204, 205 may be regarded as being either part of the calibration apparatus 210 or part of the lasers 201, 202.

The coupler 203 combines optical signals from the first and second lasers 201, 202 to produce a heterodyne optical output, e.g., an optical signal modulated at a characteristic beat frequency. By way of example, the coupler 203, may be a fiber coupler. Alternatively, a beamsplitter or other free-space optical coupler may be used. A portion of the heterodyne output from the coupler 203 is coupled to the detector 220 for use in calibrating the lasers 201, 202. In the example depicted in FIG. 2, the detector includes a local detector 221, an oscillator 222 coupled to a direct digital synthesizer (DDS) 223, and a phase locked loop (PLL) 224 coupled to the local detector 221, DDS 223 and an integrator 225. The DDS 223, PLL 224 and integrator 225 are coupled to the controller 230.

The local detector 221 is optically coupled to the coupler 203, e.g. through an optical fiber although, alternatively, they may be coupled through free space. The local detector 221 detects the difference frequency Δf between the signals from the first and second lasers 201, 202. The local detector 221 may convert the heterodyne optical signal to an electrical signal for further process. By way of example, the local detector 221 may be a model DSC 40S from Discovery Semiconductor of Princeton Junction, N.J. The PLL 224 compares the difference frequency Δf to a reference signal generated by the DDS 223 based on a base frequency generated by the oscillator 222. The integrator 225 integrates feedback from the PLL 224 into the controller 230. The controller 230 uses the feedback to drive the laser difference frequency to a target lock frequency of the PLL 224. Once frequency locking is achieved, the controller 230 can read the temperature of each laser 201, 202 to determine the data for the frequency/temperature map such as in FIG. 1D.

The frequency of the oscillator 222 and the speed of the local detector 221, DDS 223, PLL 224 and integrator 225 determine the frequency difference range that is measurable by the detector 220. Any sufficiently frequency stable signal source that produces a reference frequency in the desired range may be used as the oscillator 222. By way of example, the oscillator 222 may be a generic 160 MHz crystal oscillator. Such an oscillator 222 may in turn be phase locked to another reference signal such as an industry standard 10 MHz clock. It is desirable, for many applications, to use an oscillator 222 that is traceable to a National Institute of Standards and Technology (NIST) frequency reference. By using a NIST traceable reference oscillator, the frequency calibration of the frequency offset of the lasers 201, 202 is NIST traceable. The DDS 223 creates a subset of frequencies based on the signal from the oscillator 222. This subset is compared to the frequency of the signal from the local detector in the PLL 224. A model AD9851 from Analog Devices, Inc. of Norwood, Mass. may be used as the DDS 223 and a model PE 3240 from Peregrine Systems of San Diego, Calif. may be used as the PLL 224 To extend the frequency range of the detector to multiples of the reference frequency from the oscillator 222 it is desirable to couple a pre-scaler 226 between the local detector 221 and the PLL 224. An example of a suitable pre-scaler is a model HMC-363 from Hittite Microwave Corporation of Chelmsford, Mass.

The controller 230 may include a central processor unit (CPU) 231 and a memory 232 (e.g., RAM, DRAM, ROM, and the like). The controller 230 may also include well-known support circuits 240, such as input/output (I/O) circuits 241, power supplies (P/S) 242, a clock (CLK) 243 and cache 244. The controller 230 may optionally include a mass storage device 234 such as a disk drive, CD-ROM drive, tape drive, or the like to store programs and/or data. The controller may also optionally include a display unit 235 and user interface unit 236 to facilitate interaction between the controller 230 and a user. The display unit 235 may be in the form of a cathode ray tube (CRT) or flat panel screen that displays text, numerals, or graphical symbols. The user interface 236 may include a keyboard, mouse, joystick, light pen or other device.

The CPU 231 and other elements of the controller apparatus 210 and signal generator 200 may be coupled to each other via a system bus 250 as shown in FIG. 2. In particular the tuning controllers 204, 205, DDS 223, PLL 224, and integration 225 may be coupled to the controller 230 via the I/O circuits 241. The controller 230 typically operates the calibration apparatus 210 and signal generator 200 through the I/O circuits 241 in response to data and program code instructions 233 stored and retrieved by the memory 232 and executed by the processor 231. The program code instructions 233 could implement tuning of the lasers 202, 202 in coordination with respect to one or more readily characterized narrow frequency ranges to characterize one or more tuning parameters of each of the lasers over the extended frequency range. The code 233 may conform to any one of a number of different programming languages such as Assembly, C++, JAVA or a number of other languages. The CPU 231 forms a general-purpose computer that becomes a specific purpose computer when executing programs such as the program code 233. Although the program code 233 is described herein as being implemented in software and executed upon a general purpose computer, those skilled in the art will realize that the method of coordinated tuning of the lasers could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the program code 233 may include a set of processor readable instructions that implement a method having features in common with the method 100 of FIG. 1B.

While the above is a complete description of the preferred embodiment of the present invention, it is possible to use various alternatives, modifications and equivalents. For example, a further enhancement of the method includes comparing the previous calibration data, e.g., stored in the memory 232 or mass storage device 234 of the controller 230, to the most recent data to provide verification of accuracy and quantification of frequency drift. Furthermore, although FIG. 2 shows a reference frequency created by a PLL and DDS, many other ways exist to create the calibration information, such as using a spectrum analyzer or microwave frequency counter. Furthermore, although the method is described above with respect to calibration of two lasers, those skilled in the art will recognize that three or more lasers may be calibrated over an extended range by appropriate extension of the techniques described above. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A method for calibrating a frequency difference between two or more lasers over an extended frequency range, comprising:

tuning the lasers in coordination with respect to one or more readily characterized narrow frequency ranges to characterize one or more tuning parameters of each of the lasers over the extended frequency range, wherein tuning the lasers in coordination includes:

calibrating the frequency difference with respect to the one or more tuning parameters over a first narrow frequency range;

calibrating the frequency difference with respect to the one or more tuning parameters over a second narrow frequency range; and coordinating the resulting frequency difference calibrations for the first and second narrow frequency ranges to calibrate the frequency difference with respect to the one or more tuning parameters over the extended frequency range.

2. The method of claim 1, wherein the first and second narrow ranges frequency have at least one common calibration point.

3. The method of claim 1, wherein the one or more tuning parameters includes a temperature of at least one of the lasers.

4. A method for calibrating a frequency difference between two or more lasers over an extended frequency range, comprising:

measuring, with a frequency detector, a first value of a frequency difference between a signal from a first laser and a signal from a second laser, wherein the first frequency difference value lies within a finite range of the frequency detector;

fixing a parameter of the first laser to fix a frequency of the first laser;

varying a parameter of the second laser to vary a frequency of the second laser;

for one or more values of the second laser parameter, measuring, with the frequency detector, a second value of the frequency difference between the signal from the first laser and the signal from the second laser, wherein a frequency difference range between the first and second frequency difference values lies within the finite range of the frequency detector;

fixing the second laser parameter to fix the frequency of the second laser;

varying the first laser parameter to vary the frequency of the first laser; and for one or more values of the first laser parameter, measuring, with the frequency detector, a third value of the frequency difference between the signal from the first laser and the signal from the second laser, wherein a frequency difference range between the second and third frequency difference values lies within the finite range of the frequency detector, and wherein a frequency difference range between the first and third frequency difference values extends beyond the finite range of the frequency detector.

5. The method of claim 4 wherein the frequency difference range between the first and second frequency difference values is substantially the same as the finite range of the frequency detector.

6. The method of claim 4 wherein the frequency difference range between the second and third frequency difference values is substantially the same as the finite range of the frequency detector, whereby the frequency difference range between the first and third frequency difference values is approximately twice the finite range of the frequency detector.

7. The method of claim 4, further comprising storing one or more pairs of values of the first and second laser parameters and one or more corresponding frequency difference values.

8. The method of claim 4 further comprising determining from the first, second and third values of the frequency difference one or more calibrated frequency difference values, wherein each of the one or more frequency difference values corresponds to particular pair of values for the parameters of the first and second lasers.

9. The method of claim 8 wherein one or more of the first and second laser parameters is a laser temperature.

10. The method of claim 9 wherein the calibrated frequency difference values cover a frequency difference range that is greater than the finite range of the frequency detector.

11. The method of claim 1, wherein tuning the lasers in coordination with respect to one or more readily characterized narrow frequency ranges to characterize one or more tuning parameters of each of the lasers over the extended frequency range includes:

fixing a tuning parameter of a first laser;

varying a tuning parameter of a second laser, measuring a frequency difference value between the first and second lasers that lies within a finite range; and associating a calibrated frequency difference value with a pair of values of the tuning parameters of the lasers.

12. The method of claim 1, wherein the frequency of at least one of the lasers is tuned by changing a temperature of the laser.

13. A computer readable medium having embodied therein a set of computer readable instructions for implementing a method for calibrating two or more lasers over an extended frequency range, the method computer readable instructions comprising:

a set of instructions for tuning the lasers in coordination with respect to one or more readily characterized narrow frequency ranges to characterize one or more tuning parameters of each of the lasers over the extended frequency range, wherein execution of the instructions on a computer generates signals that cause a detector to measure a frequency difference between the lasers and one or more tuning controllers to adjust one or more tuning parameters of the lasers in response to the signals, wherein the set of computer readable instructions for tuning the lasers in coordination includes:

a set of instructions for calibrating the frequency difference with respect to the one or more tuning parameters over a first narrow frequency range;

a set of instructions for calibrating the frequency difference with respect to the one or more tuning parameters over a second narrow frequency range; and a set of instructions for coordinating the resulting frequency difference calibrations for the first and second narrow frequency ranges to calibrate the frequency difference with respect to the one or more tuning parameters over the extended frequency range.

14. An apparatus for calibrating a frequency difference between a first laser and a second laser, the apparatus comprising:
- means for calibrating the frequency difference with respect to the one or more tuning parameters over a first narrow frequency range;
- means for calibrating the frequency difference with respect to the one or more tuning parameters over a second narrow frequency range; and
- means for coordinating the resulting frequency difference calibrations for the first and second narrow frequency ranges to calibrate the frequency difference with respect to the one or more tuning parameters over the extended frequency range.

15. An apparatus for calibrating a frequency difference between a first laser and a second laser, the apparatus comprising, comprising:
- a first tuning controller coupled to the first laser;
- a second tuning controller coupled to the second laser;
- an optical coupler optically coupled to the first laser and the second laser;
- a frequency detector coupled to the optical coupler; and
- a controller coupled to the frequency detector and the first and second tuning controllers, wherein the controller includes a processor and a memory, the memory containing a set of instructions that are executable by the processor, the set of instructions implementing a method far calibrating a frequency difference between the first and second lasers over an extended frequency range, wherein the tuning controllers and frequency detector are operable in response to signals from the controller, the instructions including a set of instructions directing the tuning controllers and frequency detector to calibrate a frequency difference between the first and second lasers with respect to the one or more tuning parameters of the first and/or second laser over a first narrow frequency range that is within a frequency range of the detector;
- a set of instructions directing the tuning controllers and frequency detector to calibrate a frequency difference between the first and second lasers with respect to the one or more tuning parameters over a second narrow frequency range that is within the frequency range of the detector and that is different from the first narrow frequency range; and
- a set of instructions for coordinating the resulting frequency difference calibrations for the first and second narrow frequency ranges to calibrate the frequency difference between the first and second lasers with respect to the one or more tuning parameters over an extended frequency range that is greater than the frequency range of the detector.

16. The apparatus of claim 15 wherein the frequency detector includes a local detector optically coupled to the optical coupler, a phase locked loop coupled to the local detector and the controller, an integrator coupled to the phase locked loop and the controller, a direct digital synthesizer coupled to the phase locked loop and the controller, and a crystal oscillator coupled to the direct digital synthesizer.

17. The apparatus of claim 16 wherein the crystal oscillator is calibrated in a manner traceable to a National Institute of Standards and Technology reference source.

18. The apparatus of claim 16 wherein the frequency detector further includes a pre-scaler coupled between the local detector and the phase locked loop.

19. An optical signal generator apparatus, comprising:
- a first laser;
- a second laser;
- a first tuning controller coupled to the first laser;
- a second tuning controller coupled to the second laser;
- an optical coupler optically coupled to the first laser and the second laser;
- a frequency detector coupled to the optical coupler; and
- a controller coupled to the frequency detector and the first and second tuning controllers, wherein the controller includes a processor and a memory, the memory containing a set of instructions that are executable by the processor, the set of instructions implementing a method for calibrating a frequency difference between the first and second lasers over an extended frequency range, wherein the tuning controllers and frequency detector are operable in response to signals from the controller, the instructions including a set of instructions directing the tuning controllers and frequency detector to calibrate a frequency difference between the first and second lasers with respect to the one or more tuning parameters of the first and/or second laser over a first narrow frequency range that is within a frequency range of the detector;
- a set of instructions directing the tuning controllers and frequency detector to calibrate a frequency difference between the first and second lasers with respect to the one or more tuning parameters over a second narrow frequency range that is within the frequency range of the detector and that is different from the first narrow frequency range; and
- a set of instructions for coordinating the resulting frequency difference calibrations for the first and second narrow frequency ranges to calibrate the frequency difference between the first and second lasers with respect to the one or more tuning parameters over an extended frequency range that is greater than the frequency range of the detector.

20. The apparatus of claim 19 wherein the frequency detector includes a local detector optically coupled to the optical coupler, a phase locked loop coupled to the local detector and the controller, an integrator coupled to the phase locked loop and the controller, a direct digital synthesizer coupled to the phase locked loop and the controller, and a crystal oscillator coupled to the direct digital synthesizer.

21. The apparatus of claim 20 wherein the frequency detector further includes a pre-scaler coupled between the local detector and the phase locked loop.

22. The apparatus of claim 20 wherein the crystal oscillator is calibrated in a manner traceable to a National Institute of Standards and Technology reference source.

* * * * *